(12) United States Patent
Plavetich et al.

(10) Patent No.: US 6,899,367 B1
(45) Date of Patent: May 31, 2005

(54) MOVABLE SEAT FOR VEHICLE

(75) Inventors: Richard Plavetich, Laguna Beach, CA (US); Gary J. Ragle, Huntington Beach, CA (US); Christopher A. Schuttera, Trabuco Canyon, CA (US); Wallace R. Preston, Orange, CA (US)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/747,074

(22) Filed: Dec. 30, 2003

(51) Int. Cl.[7] .................................................. B60N 2/02
(52) U.S. Cl. .............................. 296/65.13; 296/190.11; 296/64
(58) Field of Search ........................ 296/65.13, 64, 296/190.01, 65.01, 26.09, 66, 67, 65.14, 190.11, 69, 65.05, 63, 65.11, 180.01; 248/429, 430; 297/14, 411.36, 411.38

(56) References Cited

U.S. PATENT DOCUMENTS

| | | | | | |
|---|---|---|---|---|---|
| 3,703,310 | A | * | 11/1972 | Lystad ........................ | 296/66 |
| 4,198,091 | A | * | 4/1980 | Appleton .................... | 296/64 |
| 4,480,868 | A | * | 11/1984 | Koto ....................... | 296/190.11 |
| 5,398,985 | A | * | 3/1995 | Robinson .................... | 296/64 |
| 6,260,916 | B1 | * | 7/2001 | Hunt ....................... | 296/190.11 |
| 6,276,751 | B1 | * | 8/2001 | Ikarashi et al. ........ | 296/190.11 |
| 6,412,585 | B1 | * | 7/2002 | DeAnda ................. | 296/190.01 |
| 6,416,104 | B1 | * | 7/2002 | Fisher et al. ........... | 296/190.11 |
| 6,447,039 | B1 | * | 9/2002 | Song ........................ | 296/37.6 |
| 6,450,566 | B1 | * | 9/2002 | Hong ..................... | 296/190.11 |
| 6,481,772 | B1 | * | 11/2002 | Tenn ....................... | 296/65.01 |
| 6,517,135 | B2 | * | 2/2003 | de Gaillard .............. | 296/26.09 |
| 6,550,849 | B1 | * | 4/2003 | Dosdall .................. | 296/190.11 |
| 6,786,535 | B1 | * | 9/2004 | Grzegorzewski et al. | 296/190.11 |
| 6,796,600 | B1 | * | 9/2004 | Ferer et al. ............ | 296/190.11 |
| 6,814,398 | B2 | * | 11/2004 | Hashimoto ............ | 296/190.11 |
| 2001/0030448 | A1 | * | 10/2001 | Wilson .................. | 296/190.11 |

FOREIGN PATENT DOCUMENTS

JP      2000-142476 A      5/2000

* cited by examiner

*Primary Examiner*—Kiran B. Patel
(74) *Attorney, Agent, or Firm*—Birch, Stewart, Kolasch & Birch, LLP

(57) ABSTRACT

There is provided a movable seat for a vehicle which makes it possible for passengers to feel more liberating. The vehicle is partitioned into a cab and the bed by a partition wall. A plurality of seats are provided in the cab and arranged in parallel in the direction of the width of a vehicle body. A seat moving mechanism is provided between the seats and the vehicle body, for holding the plurality of seats such that the plurality of seats can move in the direction of the width of the vehicle body, and moving the plurality of seats from the cab rearward onto the bed and holding the plurality of seats.

4 Claims, 3 Drawing Sheets

MOVABLE SEAT FOR VEHICLE

BACKGROUND OF THE INVENTION

1. Field of the Invention

The present invention relates to a seat for a vehicle, and more particularly to movable seats for a vehicle with a bed, such as a pickup truck.

2. Description of the Related Art

Conventionally, a pickup truck is partitioned into a cab and a bed by an upright partition wall, and sufficient space is not provided between the partition wall and rear seats just in front of the partition wall.

To solve this problem, there has been developed a technique in which the partition wall is tilted or moved back toward the bed to widen a space behind the rear seats so that a large reclining angle can be ensured or the rear seats themselves can be moved in the direction of the length of a vehicle body (Japanese Laid-Open Patent Publication (Kokai) No. 2000-14276).

According to the above technique, however, the width of the rear seats or seat backs must be made equal to the width of the bed, and the rear seats must be substantially level with a floor of the bed. Therefore, the above technique is encountered with the problem that even when a space in a cab is larger than the bed in the direction of the width or height, the space cannot be effectively used.

Further, the above technique is also encountered with the problem that although the cab can be widened by moving the partition wall toward the bed, passengers seated on the rear seats have their upper bodies exposed only slightly from the cab and hence do not feel liberating.

SUMMARY OF THE INVENTION

It is therefore an object of the present invention to provide a movable seat for a vehicle, provided with rear seats which make it possible to effectively use a space in a cab without being restricted by the size of the bed, and which is capable of moving onto the bed to cause passengers to feel liberating.

To attain the above object, there is provided a movable seat for a vehicle, which comprises, a partition wall that partitions the vehicle into a cab and the bed, a plurality of seats provided in the cab and arranged in parallel in a direction of a width of a vehicle body, and a seat moving mechanism provided between the seats and the vehicle body, and wherein the seat moving mechanism holds the plurality of seats such that the plurality of seats are capable of moving in the direction of the width of the vehicle body, and moves the plurality of seats from the cab rearward onto the bed and holds the plurality of seats.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE INVENTION

Figure 1:
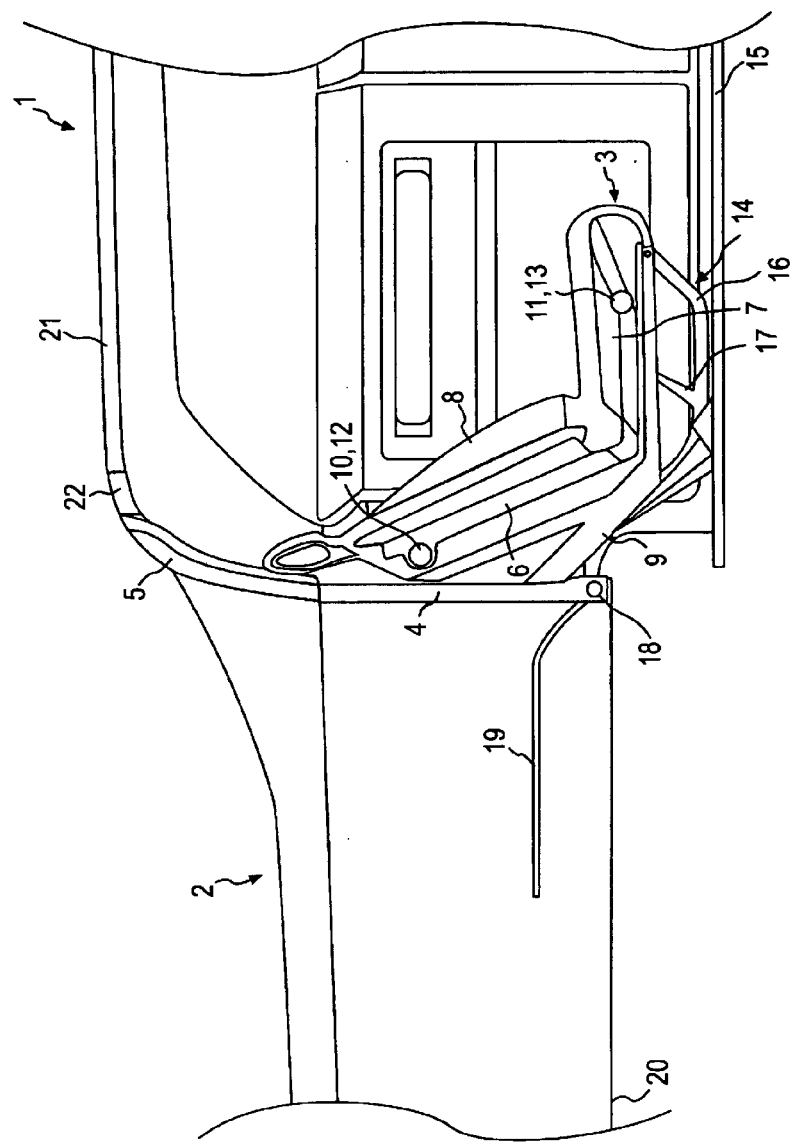
FIG. 1 is a sectional view showing a state in which seats in a vehicle according to an embodiment the present embodiment are being used.

The present invention will now be described in detail with reference to FIGS. 1 to 5 showing embodiments thereof.

In FIGS. 1 to 5, reference numerals denote a cab; 2, a bed; 3, seats; 4, a partition wall; and 5, a rear window. The illustrated example shows a double cab pickup truck.

As shown in FIG. 1, in the rear of the cab 1 in the double cab pickup truck, the two seats 3 are arranged side by side in the direction of the vehicle width. Each of the seats 3 is comprised of a seat cushion 7 and a seat back 8 fixed to a seat frame 6. The seat frame 6 is disposed on a mount 9. The mount 9 is provided with guide members 10 and 11 which are disposed at two locations on the seat back 8 side and the seat cushion 7 side, and extend in the direction of the vehicle width. On the seat back 8 side and the seat cushion 7 side, the guide members 10 and 11 are passed through holes 12 and 13, respectively, formed in the seat frames 6 so that the seats 3 can slide in the direction of the vehicle width.

One end of each link 14 is pivotally supported by both ends of the mount 9 below and in front of the seat backs 8 and in the direction of the vehicle width, and the other end of the link 14 is pivotally supported by a floor 15 of the cab 1. Each of the links 14 has a curved part 16. When the seats 3 are arranged inside the cab 1, part of each link 14 from a position where it is mounted on the floor 15 to the curved part 16 lies in contact with the floor 15 as shown in FIG. 1. Part of each link 14 from the curved part 16 to a position where the link 14 is mounted on the seat 3 extends obliquely upward, so that the mount 9 and the front of the seat cushions 7 can be positioned a predetermined height from the floor 15. Further, the right and left links 14 provided at both ends of the mount 9 are connected to each other via a supporting member 17, thus improving stiffness of the links 14.

Rollers 18 are provided at lower parts of side edges of the partition wall 4 in the direction of the vehicle width, which is provided on the mount 9 at the rear of the seat backs 8. Further, guides 19, which guide the rollers 18 rearward from the partition wall 4 while holding them, are provided at locations corresponding to the rollers 18 on sides of the bed 2. When the seats 3 are arranged in the cab 1, the positions of front ends of the guides 10 in the direction of the length of the vehicle is determined according to the height of front ends of the seat backs 8 which are disposed to rise from the floor 15 by the curved parts 16 of the links 14 so that the seat cushions 7 and the seat backs 8 can be disposed at predetermined angles suitable for passengers to be seated. The load applied to the seats 3 is supported by an area of contact between the links 14 and the floor 15 of the cab 1 via the links 14, and is also supported by the rollers 18 and the front ends of the guides 19.

The guides 19 are extended obliquely upward from the front ends thereof toward the rear, and then extended rearward horizontally. The tracks of the guides 19 are determined according to the links 14 so that the seats 3 can be moved parallel onto a bed floor 20 which is higher than the floor 15 of the cab 1, and that the mount 9 and the partition wall 4 can be inhibited from interfering with wheel houses formed at right and left ends of the bed 2.

Figure 2:
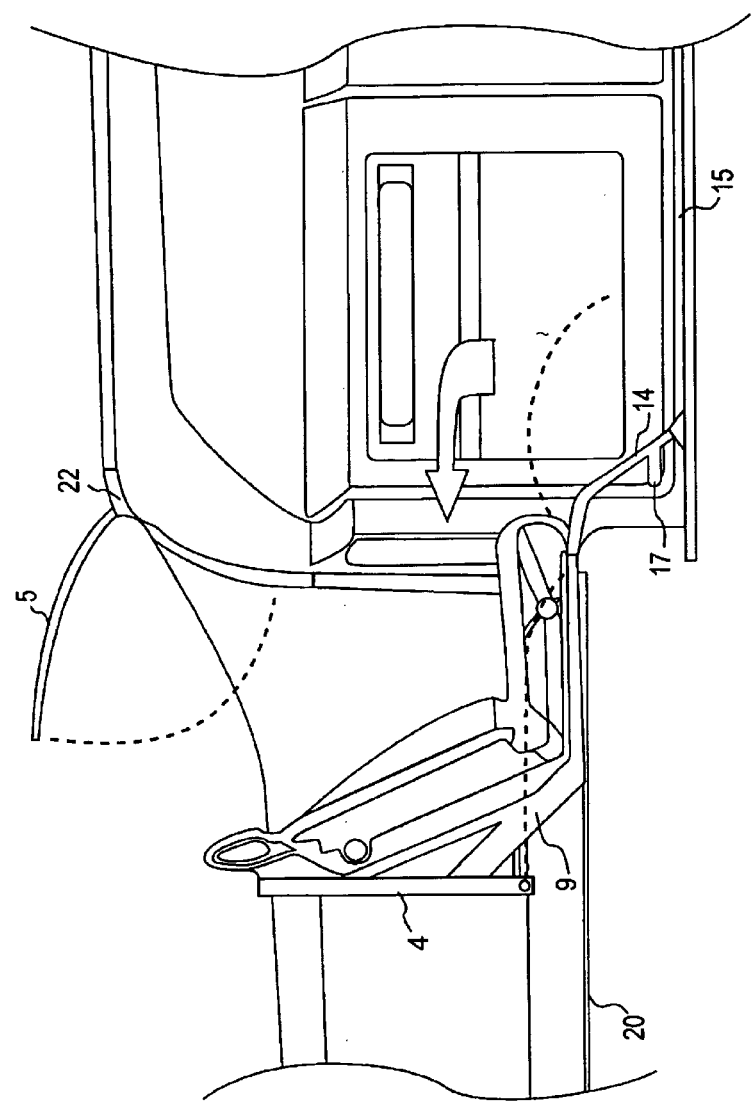
FIG. 2 is a sectional view showing a state in which the seats in FIG. 1 are moved onto a bed.

As shown in FIG. 2, when the seats 3 are moved to the rear end on the bed 2, ends of the links 14 on the-seat cushion 7 side are rotated to the front end of the bed floor 20, and the rollers 18 provided at the bottom ends of the partition wall 4 are moved to rear ends of the guides 19 and fixed by a fixing device, not shown. In this state, between the seat cushions 7 and the floor 15 of the cab 1, a supporting member 17 is bridged between the right and left links 14 such that it is substantially parallel with the floor 15 of the cab 1, so that the supporting member 17 can be used as a footrest. The load applied from the seats 3 is supported by an area of contact between the links 14 and the front end of the bed 2 and an area of contact between the rollers 18 and the guides 19.

A rear window 5 is disposed at the rear of the cab 1 and above the partition wall 4, and the upper end of the rear window 5 is supported by a roof 21 of the cab 1 such that the rear window 5 may rotate about a hinge 22. FIG. 1 shows a state in which the rear window 5 is closed, and FIG. 2 shows a state in which the rear window 5 is opened. In either state, the rear window 5 is fixed opened or closed by a fixing device, not shown.

Next, a description will be given of how to use the rear seats according to the present embodiment.

Figure 3:
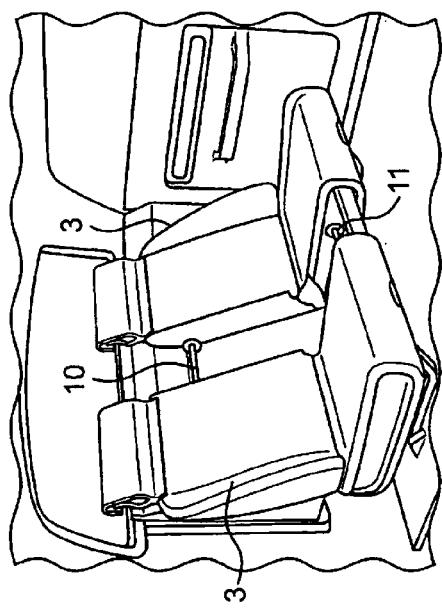
FIG. 3 is a perspective view of FIG. 1.
Figure 5:
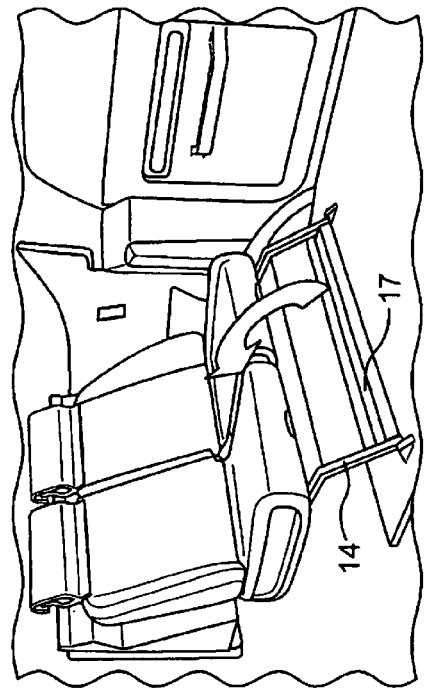
FIG. 5 is a perspective view of FIG. 2.

FIG. 3 is a view showing how the seats 3 are used in the cab 1. The right and left seats 3 are arranged apart from each other. The seats 3 are locked by locking mechanisms, not shown, which are provided below the seat cushions 7, for fixing the seat frames 6 at predetermine positions of the guide member 11, so that the seats 3 is inhibited from moving in a horizontal direction.

Figure 4:
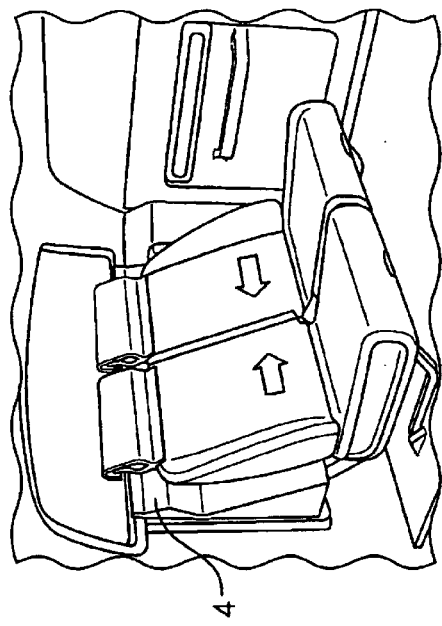
FIG. 4 is a perspective view showing a state in which the seats in FIG. 1 are moved in the direction of the width of a vehicle body.

To move the right and left seats 3 onto the bed 2, the seats 3 are released from the respective locking mechanisms, moved to the center as shown in FIG. 4, and fixed there.

Then, the rear window 5 is opened toward the bed 2, and a locking device, not shown, between the partition wall 4 and the cab 1 is released to lift the seats 3 obliquely upward toward the bed 2. Then, the seats 3 are moved toward the bed 2 while being held by the links 14 and the guides 19, and when the rollers 16 reach the rear ends of the guides 19, the seats 3 are fixed there, so that the seats 3 can be used at positions parallel with their positions in the cab 1. In this state, the rear window 5 which has been opened and locked can be used as a windscreen for passengers seated on the seats 3. Further, as the seats 3 are moved obliquely upward toward the bed 2, the seats 3 rise from the floor 15 of the cab 1, but passengers seated on the seats 3 can use the supporting member 17, which are bridged between the right and left links 14, as a footrest.

Since the right and left seats 3 are moved to the center before they are moved onto the bed 2, part of the seats 3 below the seat cushions 7 can be housed between wheelhouses at right and left ends of the bed 2, making it unnecessary to excessively raise positions where passengers are seated. Therefore, the rear window 5 can be effectively used as a windscreen, and positions where passengers are seated can be set at a height suitable for them to feel liberating. Further, in the cab 1, a long interval between the right and left seats 3 can be ensured to effectively use a space in the direction of the vehicle width.

It should be understood that the present invention is not limited to the embodiment described above, but various variations of the above-described embodiment may be possible without departing from the spirits of the present invention, including variations such as shape and construction of a part where the seats 3 are mounted.

For example, the links 14 or the mount 9 may be forced by springs so that force required for moving the seats 3 can be decreased.

Further, although in the above described embodiment, the seats 3 have front parts thereof moved by the link 14 and rear parts thereof moved by sliding of the rollers 18 in the guides 19, the present invention is not limited to this, but additional links may be provided between the rear part of the mount 9 and the vehicle body so that the seats 3 can be moved in parallel between the cab 1 and the bed 2.

Further, the mount 9 may be divided into right and left parts in the middle in the direction of the vehicle width, and the right and left mounts 9 are mounted on the vehicle body via links, so that the right and left seats 3 can be moved onto the bed 2 independently of each other.

Further, although in the above described embodiment, the guide members 10 and 11 for moving the seats 3 in the direction of the vehicle width are provided on the seat cushion 7 side and the seat back 8 side in the seat frames 6, and hence the angles of the respective seat backs 8 of the right and left seats 3 cannot be adjusted independently of each other, the present invention is not limited to this, but guide members may be provided in parallel on the seat cushion 7 side so that the respective seatbacks 8 of the right and left seats 3 can be adjusted independently of each other.

Further in the above-described embodiment, the present invention is applied to the rear seats (second-row seats) of the double cab pickup truck, but may be applied to a single cab pickup truck.

What is claimed is:

1. A vehicle, comprising:
    a partition wall that partitions the vehicle into a cab and a bed;
    seats provided in the cab; and
    a seat moving mechanism provided between said seats and a vehicle body, said seat moving mechanism having links with one ends thereof pivotally supported by front parts of said seats and the other ends thereof pivotally supported by a floor, and moving said seats from the cab rearward and upward onto the bed and holds said seats.

2. The vehicle according to claim 1, wherein said seat moving mechanism includes guides that restricts moving tracks of said links and said seats such that said links and said seats move in parallel.

3. The vehicle according to claim 1, wherein:
    said partition wall includes an upper partition wall and a lower partition wall;
    said seat and said lower partition wall are moved by said seat moving mechanism; and
    said upper partition wall has one end thereof being pivotally supported by the vehicle body, and has the other end thereof being rotated toward a rear and upper part of the vehicle to serve as a windscreen when said seats are moved onto the bed.

4. The vehicle according to claim 1, wherein said links includes a step serving as a footrest when said seats are moved rearward.

* * * * *